(12) United States Patent
Lin et al.

(10) Patent No.: US 11,357,257 B2
(45) Date of Patent: Jun. 14, 2022

(54) ELECTRONIC CIGARETTE VAPORIZER (71) Applicant: HUIZHOU HAPPY VAPING TECHNOLOGY LIMITED, Guangdong (CN)

(72) Inventors: Guangrong Lin, Guangdong (CN); Xianbin Zheng, Guangdong (CN)

(73) Assignee: HUIZHOU HAPPY VAPING TECHNOLOGY LIMITED, Huizhou (CN)

( * ) Notice: Subject to any disclaimer, the term of this patent is extended or adjusted under 35 U.S.C. 154(b) by 496 days.

(21) Appl. No.: 16/477,185

(22) PCT Filed: Dec. 1, 2017

(86) PCT No.: PCT/CN2017/114310
§ 371 (c)(1),
(2) Date: Jul. 10, 2019

(87) PCT Pub. No.: WO2018/130023
PCT Pub. Date: Jul. 19, 2018

(65) Prior Publication Data
US 2019/0364972 A1 Dec. 5, 2019

(30) Foreign Application Priority Data
Jan. 12, 2017 (CN) .......................... 201710022903.3

(51) Int. Cl.
*A24F 40/40* (2020.01)
*H05B 3/06* (2006.01)
(Continued)

(52) U.S. Cl.
CPC ............ *A24F 40/40* (2020.01); *A24F 40/485* (2020.01); *H05B 3/06* (2013.01); *A24F 15/015* (2020.01); *A24F 40/10* (2020.01); *B67D 2001/0093* (2013.01); *F16J 15/021* (2013.01); *H05B 2203/021* (2013.01)

(58) Field of Classification Search
None
See application file for complete search history.

(56) References Cited

U.S. PATENT DOCUMENTS

9,848,652 B2 * 12/2017 Lin .................. H02J 7/0042
9,848,653 B2 * 12/2017 Lin .................. A24F 40/485
(Continued)

*Primary Examiner* — Ross N Gushi (57) ABSTRACT

An electronic cigarette vaporizer comprises a hollow vaporizer housing and a vaporizing device sleeved inside the vaporizer housing; wherein the vaporizer housing has a mouthpiece end and an opening end arranged with a connecting device for connection with the battery component, a mouthpiece is arranged in a center of the mouthpiece end, a vapor outlet tube extending in an inward direction from the mouthpiece to a middle portion of the vaporizer housing is arranged; wherein the vaporizing device is disposed in the vaporizer housing at one side where the opening end is formed, and comprises a vapor tube sleeve, a throttle lid, a heating unit, a vaporizing base and an electrode lid, which are arranged in turn towards the outer side from the inner side, and the throttle lid is provided with throttle orifices for directly communicating the liquid storage chamber and the end portions of the liquid guiding strip.

10 Claims, 12 Drawing Sheets

(51) Int. Cl.
*A24F 40/485* (2020.01)
*B67D 1/00* (2006.01)
*F16J 15/02* (2006.01)
*A24F 15/015* (2020.01)
*A24F 40/10* (2020.01)

(56) References Cited

U.S. PATENT DOCUMENTS

| | | | |
|---|---|---|---|
| 9,913,496 B2* | 3/2018 | Lin | A24D 3/16 |
| 9,924,744 B2* | 3/2018 | Lin | A24F 40/40 |
| 10,912,337 B2* | 2/2021 | Lin | A24F 40/44 |
| 10,980,284 B2* | 4/2021 | Lin | A24F 40/42 |
| 11,051,550 B2* | 7/2021 | Lin | A24F 40/485 |
| 11,083,224 B2* | 8/2021 | Lin | A24F 40/48 |
| 11,213,638 B2* | 1/2022 | Nettenstrom | A61M 15/06 |
| 2019/0364972 A1* | 12/2019 | Lin | A24F 40/485 |
| 2019/0387800 A1* | 12/2019 | Lin | F16J 15/06 |
| 2020/0397046 A1* | 12/2020 | Lin | A24F 40/30 |
| 2021/0059308 A1* | 3/2021 | Lin | A24F 40/40 |

* cited by examiner

ELECTRONIC CIGARETTE VAPORIZER

FIELD OF THE INVENTION

The present invention relates to the technical field of electronic cigarettes, and in particular, the present invention relates to an electronic cigarette vaporizer.

BACKGROUND OF THE INVENTION

The electronic cigarettes usually heat the e-cigarette liquid by means of a vaporizer, to produce vapor for the user. Since the e-cigarette liquid does not contain tobacco tars, the e-cigarettes are widely used and gradually replace the tobacco cigarettes.

Existing electronic cigarette vaporizers usually are arranged with a liquid storage chamber for storing the e-cigarette liquid, and the vaporizing device may be arranged with a heating unit, by means of which the e-cigarette liquid can be heated and vaporized. Due to the force of gravity of the e-cigarette liquid in a non-working state or the negative pressure generated in the vaporizing chamber in a working state, the e-cigarette liquid may leak into the vaporizing chamber if the connection between the heating unit and the liquid storage chamber or the liquid supply chamber has poor sealing. Since poor sealing is a common problem of existing electronic cigarette vaporizers for structure and manufacturing technical reasons, usually a permeation layer or liquid storage medium is arranged between the liquid storage chamber and the heating unit. However, the permeation layer and the liquid storage medium may hinder a quick supply of the e-cigarette liquid to the heating unit, cause less vapor to be produced in a unit time, and affect the user experience during using.

SUMMARY OF THE INVENTION

Technical Problems

The present invention aims to provide an electronic cigarette vaporizer which can avoid liquid leakage and meanwhile realize sufficient liquid supply and can produce a lot of vapor during using.

Technical Solutions

To this end, the present invention provides a technical solution as follows. An electronic cigarette vaporizer comprises hollow vaporizer housing and a vaporizing device sleeved inside the vaporizer housing;

wherein the vaporizer housing has a mouthpiece end and an opening end, wherein a mouthpiece is arranged in the center of the mouthpiece end, a vapor outlet tube extends inside the vaporizer housing in an inward direction from the mouthpiece to a middle portion of the vaporizer housing, and the opening end is arranged with a connecting device for connection with a battery component;

wherein the vaporizing device is disposed in the vaporizer housing at one side where the opening end is formed, and the vaporizing device comprises a vapor tube sleeve, a throttle lid, a heating unit, a vaporizing base and an electrode lid, which are arranged in turn towards the outer side from the inner side, and the heating unit comprises a liquid guiding strip and a heating coil wound around a middle portion of the liquid guiding strip;

wherein the cup-shaped vapor tube sleeve is sleeved onto the outer wall of the opening end of the vapor outlet tube, and a vapor outlet hole is formed at the bottom of the vapor tube sleeve;

wherein the throttle lid is provided with a center hole and throttle orifices, wherein the inner wall of the upper portion of the center hole abuts against the outer wall of the vapor tube sleeve, the outer circumferential wall of the throttle lid abuts against the inner wall of the vaporizer housing, and a liquid storage chamber is formed between the upper side of the throttle lid, the outer wall of the vapor outlet tube, and the inner wall of the vaporizer housing, wherein the throttle orifices are in communication with the liquid storage chamber, the lower side of the throttle lid is provided with an annular ring protruding downwards from the inner wall of the center hole, and the bottom of the annular ring is formed in a radial direction with upper grooves which accommodate the upper half of the liquid guiding strip extending transversely and divide the lower portion of the annular ring into two half annular rings;

wherein a concave cavity extending downwards is formed at the center of the upper end of the vaporizing base, and a first air inlet is provided at the bottom of the concave cavity, the lower grooves which accommodate the lower half of the liquid guiding strip extending transversely are formed in a radial direction at two sides of the concave cavity on the upper end of the vaporizing base, and half annular grooves for accommodating respective half annular rings are provided at two sides of the grooves and around the concave cavity;

wherein the throttle lid fits tightly over the vaporizing base, the upper grooves and the lower grooves are vertically aligned with each other and joined to seal the liquid guiding strip, the liquid guiding strip extends between the upper grooves and the lower grooves, the half annular rings are sealingly received in the half annular grooves, a vaporizing chamber is defined between the concave cavity and the bottom of the vapor tube sleeve, and the throttle orifices are in communication with the two end portions of the liquid guiding strip;

wherein the electrode lid is disposed at the bottom of the vaporizing base and is fixed to the inner wall of the opening end of the vaporizer housing, the electrode lid is arranged with positive and negative electrodes for electrically connecting with two ends of the heating coil, and a second air inlet is provided at the center of the electrode lid.

Preferably, a metal sleeve is sleeved at the outer wall of the vapor tube sleeve, the lower portion of the metal sleeve is sleeved in the center hole of the throttle lid and abuts against the inner walls of the half annular rings, and the lower portion of the metal sleeve is provided, at a position corresponding to the upper grooves of the throttle lid, with U-shaped notches through which the liquid guiding strip can extend.

Preferably, the throttle orifices are arranged above the two end portions of the liquid guiding strip, and the two end portions of the liquid guiding strip are not in communication with the half annular grooves in the case that the lower grooves and the upper grooves are joined.

Preferably, cavities are formed at the bottoms of the half annular grooves, the throttle orifices extending through the half annular rings can be in communication with the cavities formed at the bottoms of the half annular grooves, and the two end portions of the liquid guiding strip are respectively in communication with the half annular grooves in the case that the lower grooves and the upper grooves are joined.

Preferably, the connecting device may comprise a male snap formed on the outer wall of the opening end of the vaporizer housing, which male snap may be correspondingly snap-fitted to a snap-in groove provided on the inner wall of the connecting end of the battery component.

Preferably, the vaporizing base and the throttle lid are respectively formed with liquid refilling holes communicating with each other, the liquid refilling holes are in communication with the liquid storage chamber, and the electrode lid is further arranged with a plunger for correspondingly blocking the liquid refilling hole of the vaporizing base.

Preferably, the end portion of the opening end of the vaporizer housing is provided with an intake air gap of the vaporizer housing.

Preferably, the vapor tube sleeve is made of soft materials, and it is provided on its inner wall and its outer wall with a plurality of protruding rings to improve sealing performance.

Preferably, the vaporizing base is made of soft materials and it is provided on its outer wall with a plurality of protruding rings to improve sealing performance.

Preferably, the cross section of the vaporizer housing is oval-shaped and gradually increases from top to bottom.

Technical Advantages

Since the electronic cigarette vaporizer is provided with the throttle lid having throttle orifices for directly communicating the liquid storage chamber and the end portions of the liquid guiding strip of the vaporizing base, and the vaporizing base, which are sealingly connected, a direct supply of the liquid can be realized without any permeation layer or liquid storage medium. The electronic cigarette vaporizer can realize quick supply of the liquid during using, greatly increase the amount of vapor produced in a unit time, allow the vapor to flow out smoothly, and improve user experience. Furthermore, the upper grooves provided on the throttle lid and the lower grooves provided on the vaporizing base can be joined to sealingly accommodate the liquid guiding strip, thereby preventing the e-cigarette liquid stored in the liquid storage chamber from leaking into the vaporizing chamber to cause failure and ensuring stable operation of the electronic cigarette vaporizer.

Herein, reference numerals of main components are as follows:

A. vaporizing device; 1. vaporizer housing; 11. mouthpiece end; 111. mouthpiece; 112. vapor outlet tube; 113. inner tube body; 114. annular-shaped condensing groove; 12. opening end; 121. intake air gap of vaporizer housing; 122. snap-in holes; 13. liquid storage chamber; 14. male snaps; 15. air inlet groove; 2. vapor tube sleeve; 21. vapor outlet hole; 22. protruding rings; 3. metal sleeve; 31. U-shaped notches; 4. throttle lid; 40. liquid refilling hole; 41. center hole; 42. throttle orifices; 43. annular ring; 431. upper grooves; 432. half annular rings; 5. heating unit; 51. liquid guiding strip; 52. heating coil; 53. leads; 6. vaporizing base; 60. liquid refilling hole; 61. concave cavity; 62. first air inlet; 63. lower grooves; 64. half annular grooves; 65. vaporizing chamber; 66. protruding rings; 67. electrode holes; 68. lead through-holes; 7. electrode lid; 71. electrodes; 72. second air inlet; 73. plunger; 74. intake air gap of electrode lid; 75. male snaps of electrode lid.

DETAILED DESCRIPTION OF ILLUSTRATED EMBODIMENTS

Figure 1:
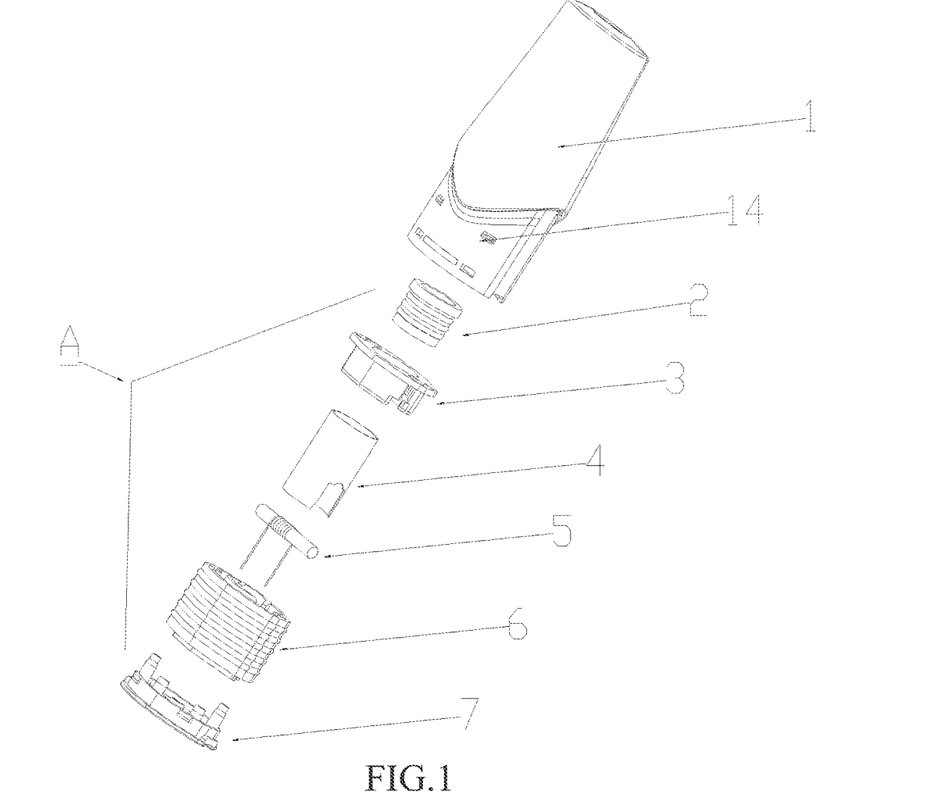
FIG. 1 is an exploded view illustrating the first and second embodiments of the present invention.

For convenience of description, the electronic cigarette vaporizer of the present invention is described hereinafter in a condition that the electronic cigarette vaporizer is vertically disposed with its mouthpiece end 11 facing upward, as shown in FIG. 1. It should be understood that, as used herein, the expresses such as upper, lower, top, bottom, upper end, lower end, upper side and lower side, are intended to indicate orientation and position relationships in a condition that the electronic cigarette vaporizer is vertically disposed with its mouthpiece end facing upward.

Embodiment 1

Referring to FIG. 1, an electronic cigarette vaporizer of the present invention comprises a hollow vaporizer housing 1 and a vaporizing device A sleeved inside the vaporizer housing 1.

Figure 2:
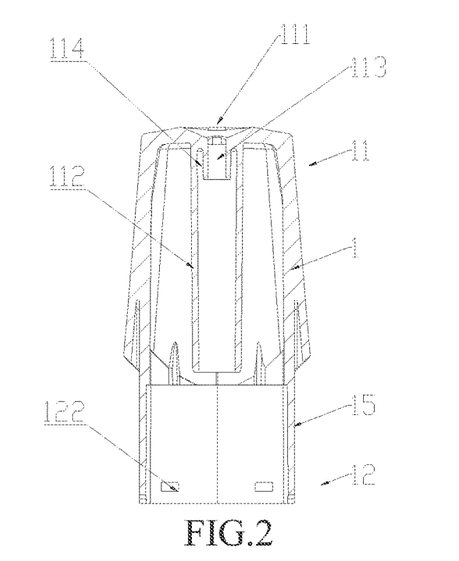
FIG. 2 is a front sectional view of a vaporizer housing according to the first and second embodiments of the present invention.
Figure 3:
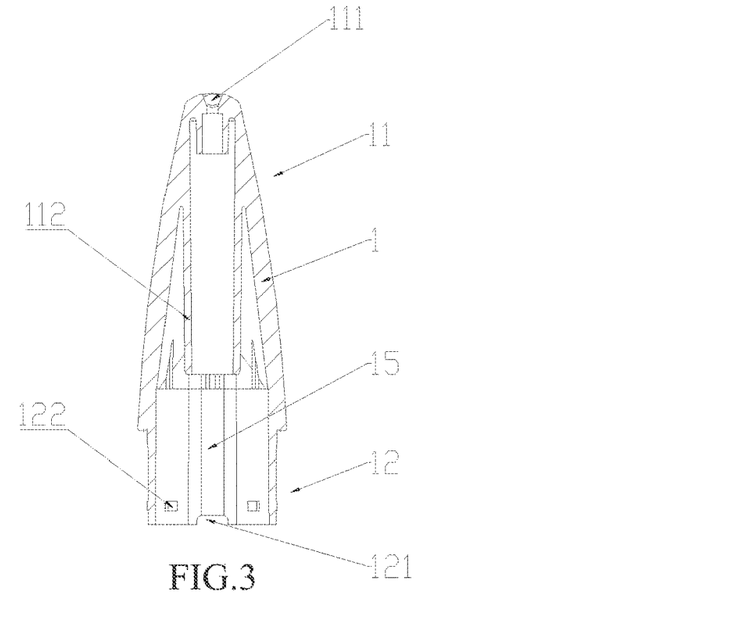
FIG. 3 is a sectional side view of the vaporizer housing according to the first and second embodiments of the present invention.

Referring to FIGS. 2 and 3, the vaporizer housing 1 has a mouthpiece end 11 and an opening end 12, wherein a mouthpiece 111 is arranged in the center of the mouthpiece end 11, a vapor outlet tube 112 extends inside the vaporizer housing in an inward direction from the mouthpiece 111 to a middle portion of the vaporizer housing, and the opening end 12 is arranged with a connecting device for connection with a battery component (not shown). In the present embodiment of the present invention, an inner tube body 113 may be arranged inside the vapor outlet tube 112 at an end adjacent to the mouthpiece 111, and an annular-shaped condensing groove 114 for turning the vapor back and collecting condensed water droplets or small droplets that are not vaporized in the vapor may be formed between the inner tube body 113 and the vapor outlet tube 112. In the present embodiment of the present invention, the outer diameter of the opening end 12 gradually decreases such that a plug-in device can be formed to facilitate plug-in connection into the battery component. The connecting device may be male snaps 14 formed on the outer wall of the opening end 12 of the vaporizer housing, which male snaps 14 may be correspondingly snap-fitted to snap-in holes (not shown) provided on the inner wall of the connecting end of the battery component, to establish a snap-in connection. In the present embodiment of the present invention, the wall portion of the opening end 12 of the vaporizer housing is formed with snap-in holes 122.

Referring to FIGS. 1, 4, 5 and 6, the vaporizing device A of the present invention is disposed in the vaporizer housing 1 at one side where the opening end 12 is formed. The vaporizing device A comprises a vapor tube sleeve 2, a metal sleeve 3, a throttle lid 4, a heating unit 5, a vaporizing base 6 and an electrode lid 7, which are arranged in turn towards the outer side from the inner side of the vaporizer housing 1. Herein, the heating unit 5 comprises a liquid guiding strip 51 and a heating coil 52 wound around a middle portion of the liquid guiding strip 51, and leads 53 serving for electrically connecting the electrodes 71 which will be described below are arranged at two ends of the heating coil 52. The liquid guiding strip 51 may be made of materials such as glass fibers, ceramic fibers and porous ceramics which are heat-resisting and easy to absorb and guide the e-cigarette liquid.

Referring to FIGS. 4, 5, 7 and 8, the vapor tube sleeve 2 is cup-shaped and sleeved onto the outer wall of the lower opening end of the vapor outlet tube 112, and a vapor outlet hole 21 which is in communication with the vapor outlet tube 112 is formed at the bottom of the vapor tube sleeve 2.

Referring to FIGS. 4, 5, and 9-13, the throttle lid 4 is provided with a center hole 41 and throttle orifices 42, wherein the inner wall of the upper portion of the center hole 41 tightly abuts against the outer wall of the vapor tube sleeve 2, the outer circumferential wall of the throttle lid 4 abuts against the inner wall of the vaporizer housing 1, and a liquid storage chamber 13 for storing the e-cigarette liquid is formed between the upper side of the throttle lid 4, the outer wall of the vapor outlet tube 112, and the inner wall of the vaporizer housing 1. Herein, the throttle orifices 42 are arranged above the two end portions of the liquid guiding strip 51, such that the two end portions of the liquid guiding strip 51 are in direct communication with the liquid storage chamber 13. The lower side of the throttle lid 4 is provided with an annular ring 43 protruding downwards from the inner wall of the center hole 41, and the bottom of the annular ring 43 is formed in a radial direction with two symmetrical upper grooves 431 which accommodate the upper half of the liquid guiding strip 51 extending transversely. The lower portion of the annular ring is divided into two half annular rings 432 by the upper grooves 431.

Referring to FIGS. 4, 5, and 14-17, a concave cavity 61 extending downwards is formed at the center of the upper end of the vaporizing base 6, and a first air inlet 62 is provided at the bottom of the concave cavity 61. Herein, lead through-holes 68 through which the leads 53 of the heating coil 52 can pass are provided at two sides of the first air inlet 62. Lower grooves 63 which accommodate the lower half of the liquid guiding strip 51 extending transversely are formed in a radial direction at two sides of the concave cavity 61 on the upper end of the vaporizing base 6, and half annular grooves 64 for accommodating respective half annular rings 432 are provided at two sides of the lower grooves 63 and around the concave cavity 61.

Figure 23:
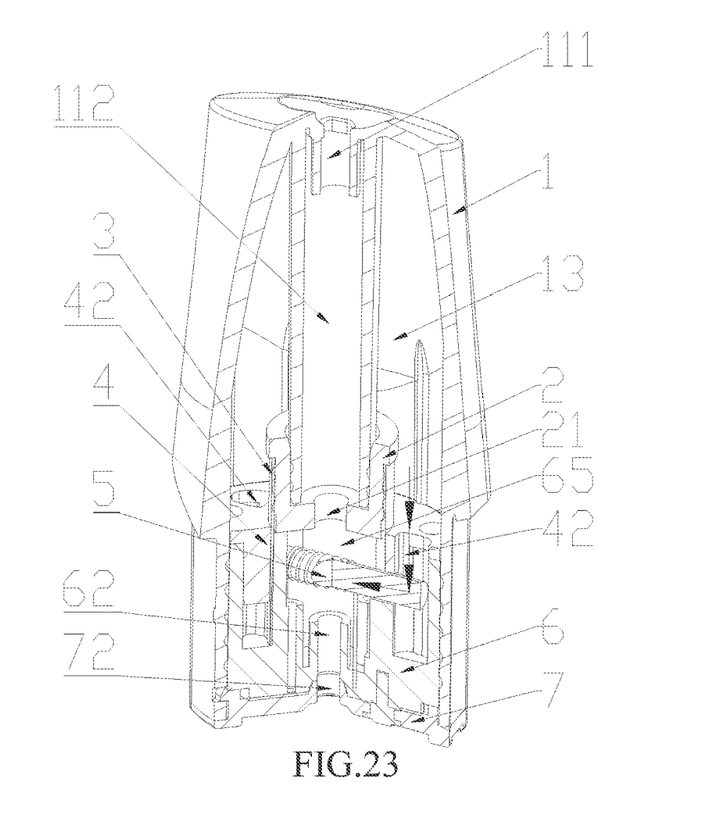
FIG. 23 is a partial perspective sectional view illustrating the first embodiment of the present invention.
Figure 24:
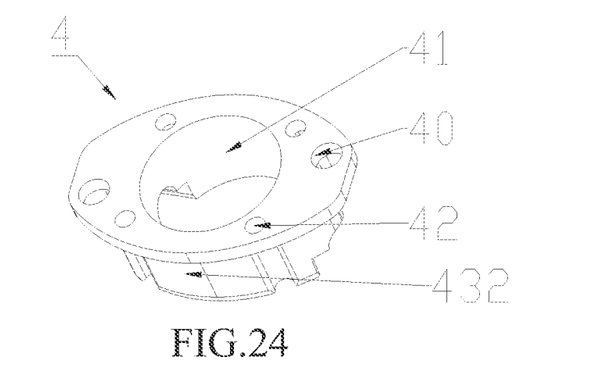
FIG. 24 is a first perspective view of a throttle lid according to the second embodiment of the present invention.
Figure 25:
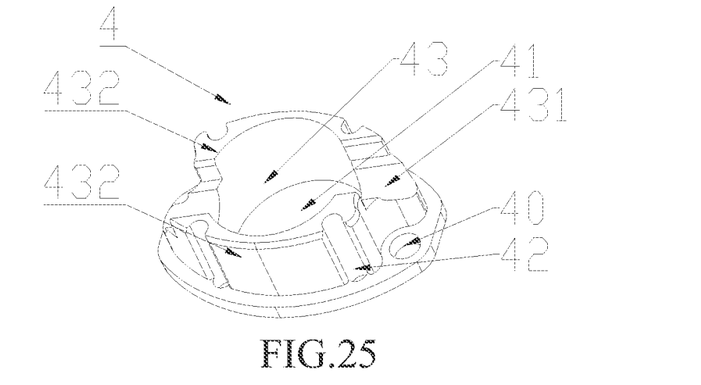
FIG. 25 is a second perspective view of the throttle lid according to the second embodiment of the present invention.
Figure 26:
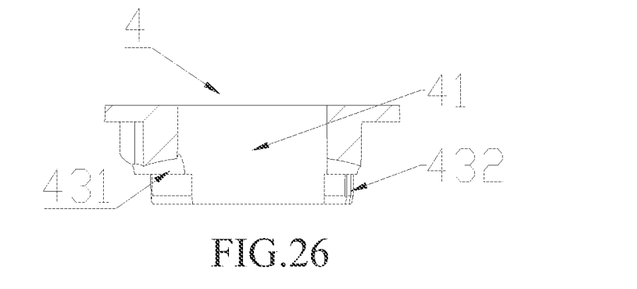
FIG. 26 is a front sectional view of the throttle lid according to the second embodiment of the present invention.
Figure 27:
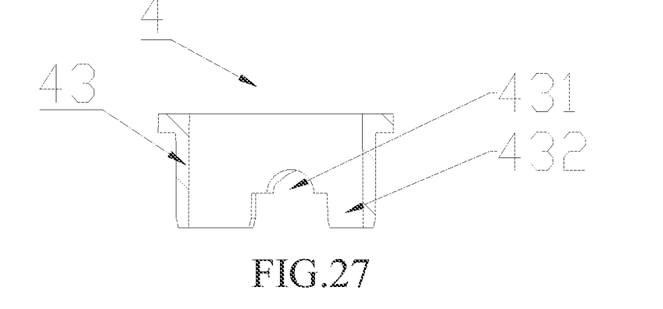
FIG. 27 is a sectional side view of the throttle lid according to the second embodiment of the present invention.
Figure 28:
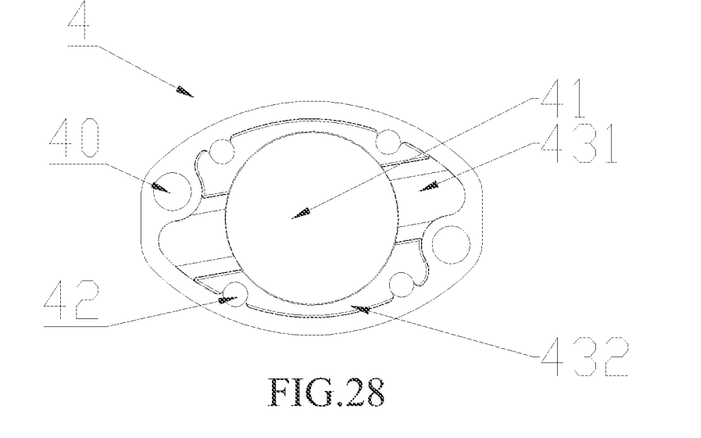
FIG. 28 is a bottom view of the throttle lid according to the second embodiment of the present invention.
Figure 29:
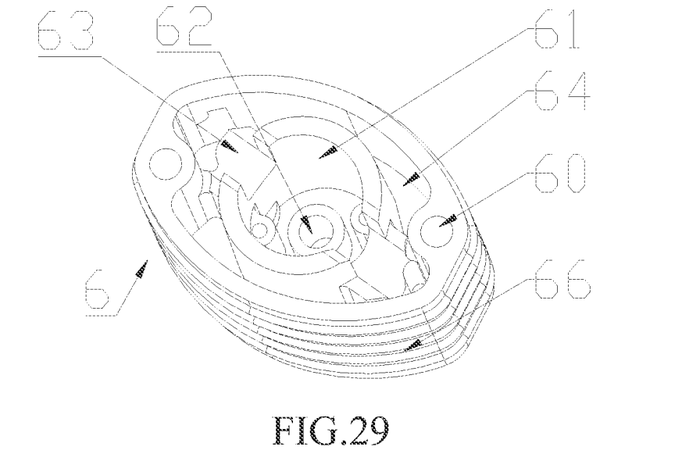
FIG. 29 is a perspective structural view of a vaporizing base according to the second embodiment of the present invention.
Figure 30:
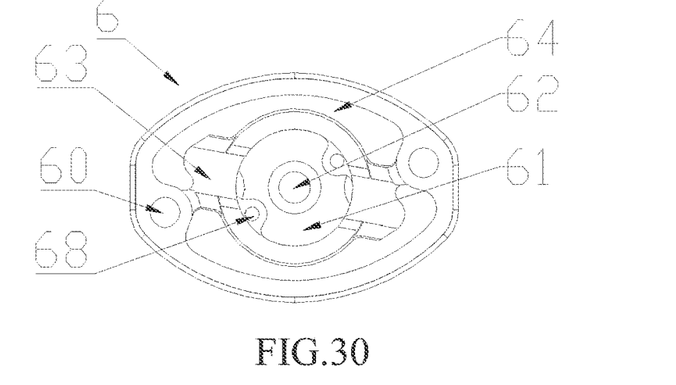
FIG. 30 is a top view of the vaporizing base according to the second embodiment of the present invention.
Figure 31:
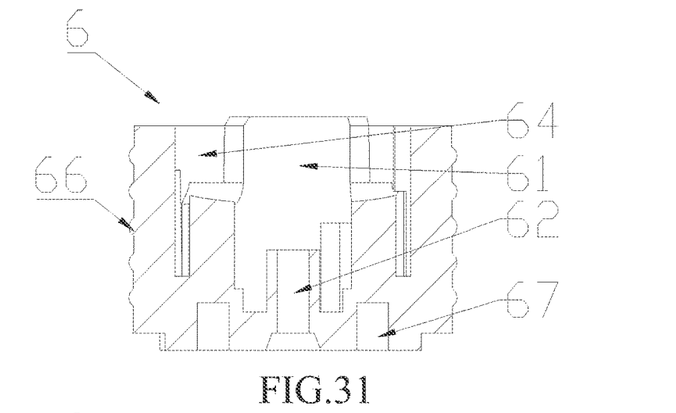
FIG. 31 is a front sectional view of the vaporizing base according to the second embodiment of the present invention.
Figure 32:
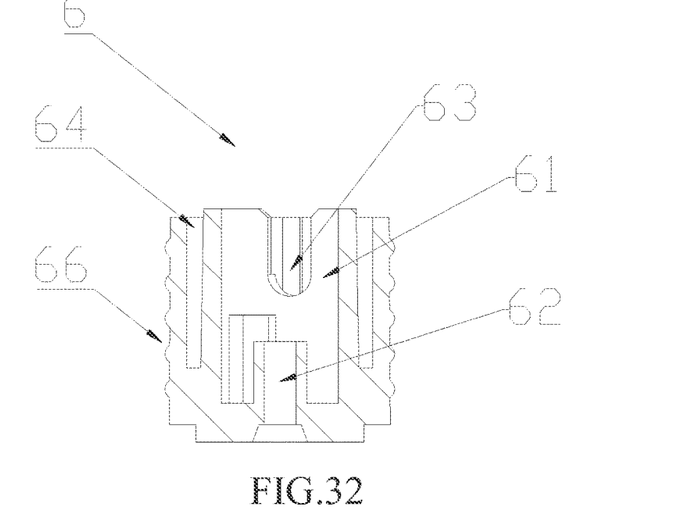
FIG. 32 is a sectional side view of the vaporizing base according to the second embodiment of the present invention.

Referring to FIGS. 1, 4, 5, and 23, the throttle lid 4 fits tightly over the vaporizing base 6, the upper grooves 431 and the lower grooves 63 are vertically aligned with each other and joined to seal the liquid guiding strip 51. The liquid guiding strip 51 extends between the upper grooves 431 and the lower grooves 63 with no gap, the half annular rings 432 are sealingly received in the half annular grooves 64, and a vaporizing chamber 65 is defined between the concave cavity 61 and the bottom of the vapor tube sleeve 2. The throttle orifices 42 are arranged above the two end portions of the liquid guiding strip 51, and the two end portions of the liquid guiding strip 51 are not in communication with the half annular grooves 64 in the case that the upper grooves 431 and the lower grooves 63 are joined, such that the e-cigarette liquid stored in the liquid storage chamber 13 can directly flow to the two end portions of the liquid guiding strip 51 through the throttle orifices 42. The liquid guiding strip 51 can absorb the e-cigarette liquid at the two end portions, and the e-cigarette liquid guided to the middle portion can be heated and vaporized by means of the heating coil 52. Such liquid supply method is a direct liquid supply method through the throttle orifices, and FIG. 23 shows the direction in which the e-cigarette liquid flows. Due to the structure in which the throttle lid 4 and the vaporizing base 6 are sealingly connected and the upper grooves 431 and the lower grooves 63 are vertically aligned with each other and joined to seal the liquid guiding strip 51, the e-cigarette liquid at the two ends of the liquid guiding strip 51 is prevented from directly leaking into the vaporizing chamber 65. Furthermore, due to the sealing structures between the vapor tube sleeve 2 and the outer wall of the vapor outlet tube 112, and the inner wall of the center hole 41 of the throttle lid 4, the e-cigarette liquid in the liquid storage chamber 13 is prevented from directly leaking into the vaporizing chamber 65, thereby ensuring normal operation of the vaporizer.

Referring to FIGS. 4, 5, and 18-20, the electrode lid 7 is disposed at the bottom of the vaporizing base 6 and is fixed to the inner wall of the opening end 12 of the vaporizer housing, the electrode lid 7 is arranged with electrodes 71 for electrically connecting with two ends of the heating coil 52, and a second air inlet 72 is provided at the center of the electrode lid 7. The male snaps 75 of the electrode lid may be provided on the outer circumferential wall of the electrode lid 7. The male snaps 75 of the electrode lid can be correspondingly engaged in the snap-in holes 122 provided on the vaporizer housing 1 in order to fix the electrode lid 7.

Referring to FIGS. 4, 5, 21, and 22, a metal sleeve 3 is sleeved at the outer wall of the vapor tube sleeve 2, the lower portion of the metal sleeve 3 is sleeved in the center hole 41 of the throttle lid and abuts against the inner walls of the half annular rings 432, and the lower portion of the metal sleeve 3 is provided, at a position corresponding to the upper grooves 431 of the throttle lid 4, with U-shaped notches 31 through which the liquid guiding strip 51 can extend. In the embodiment of the present invention, the metal sleeve 3 serves to rigidly support the vapor tube sleeve and realize the connection between the vapor tube sleeve and the vaporizing base. Meanwhile, the metal sleeve 3, which reaches to the inner wall of the half annular rings 432 around the vaporizing chamber 65, can suppress a direct outward radiation of the high temperature heat generated during the working of the heating coil 52, and avoids the risk of scalding caused by the heated vaporizer housing 1. It can absorb, conduct and dissipate the heat quickly, thereby avoiding deformation of the vapor tube sleeve 2 or the vaporizing base 6 which may be caused by high temperature and result in failure or bad taste.

Referring to FIG. 23, the throttle orifices 42 in the embodiment of the present invention are arranged right above the ends of the liquid guiding strip 51, and the e-cigarette liquid in the liquid storage chamber 13 can be supplied to two ends of the liquid guiding strip 51 through the throttle orifices 42 in a throttling manner. Since the lower grooves 63 are not in communication with the half annular grooves 64, the e-cigarette liquid can be prevented from flowing into the half annular grooves 64.

Referring to FIGS. 9-15, the vaporizing base 6 and the throttle lid 4 are respectively formed with liquid refilling holes 60 (40) communicating with each other, and the liquid refilling holes 60 (40) are in communication with the liquid storage chamber 13. The liquid refilling holes 60 (40) have a function, that is, when the e-cigarette liquid in the liquid storage chamber 13 runs out, the e-cigarette liquid can be refilled into the liquid storage chamber 13 via the liquid refilling holes 60 (40), to enable repeated use of the vaporizer of the present invention.

Figure 18:
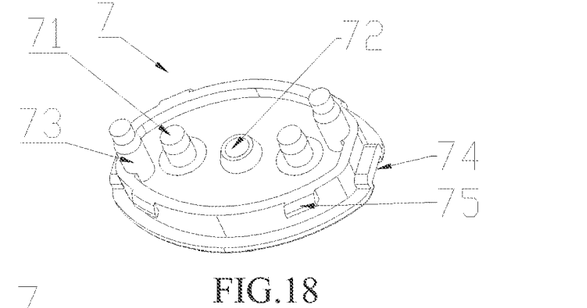
FIG. 18 is a perspective view of an electrode lid according to the first and second embodiments of the present invention.
Figure 19:
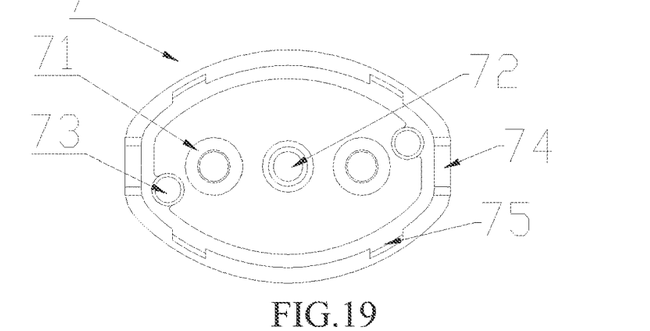
FIG. 19 is a top view of the electrode lid according to the first and second embodiments of the present invention.
Figure 20:
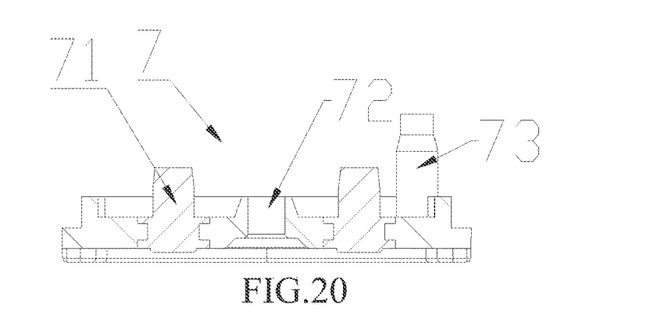
FIG. 20 is a sectional view of the electrode lid according to the first and second embodiments of the present invention.
Figure 21:
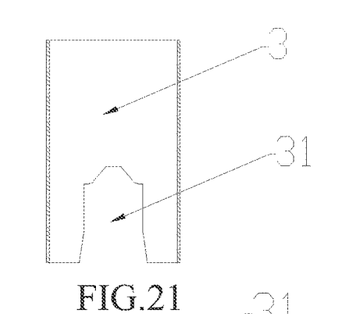
FIG. 21 is a side view of a metal sleeve according to the first and second embodiments of the present invention.
Figure 22:
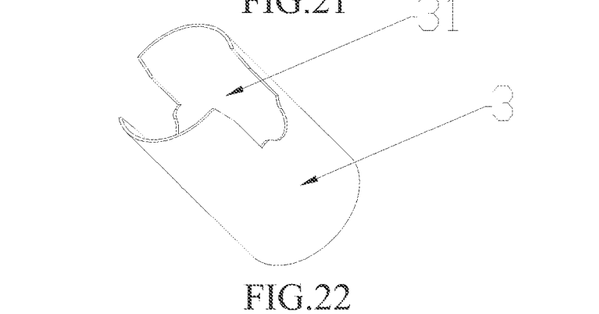
FIG. 22 is a perspective view of the metal sleeve according to the first and second embodiments of the present invention.

Referring to FIGS. 18-20, the electrode lid 7 of the vaporizer of the present invention is further arranged with a plunger 73 for correspondingly blocking the liquid refilling hole 60 of the vaporizing base 6. When it is necessary to refill the e-cigarette liquid, the plunger 73 can be pulled out as long as the electrode lid 7 is opened. The liquid refilling hole 60 can be exposed to facilitate refilling and can be blocked after the refilling, to avoid leakage of the e-cigarette liquid.

Figure 4:
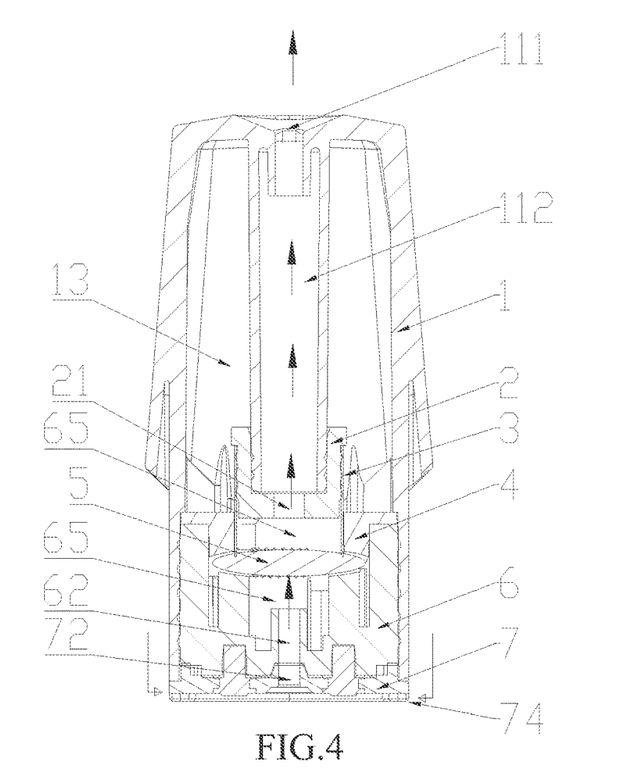
FIG. 4 is a front sectional view illustrating the first and second embodiments of the present invention.
Figure 5:
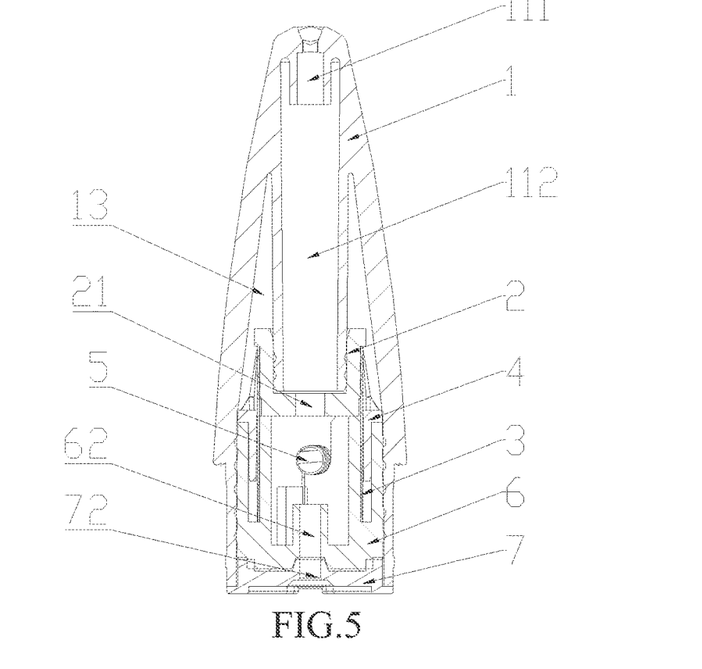
FIG. 5 is a sectional side view illustrating the first and second embodiments of the present invention.
Figure 6:
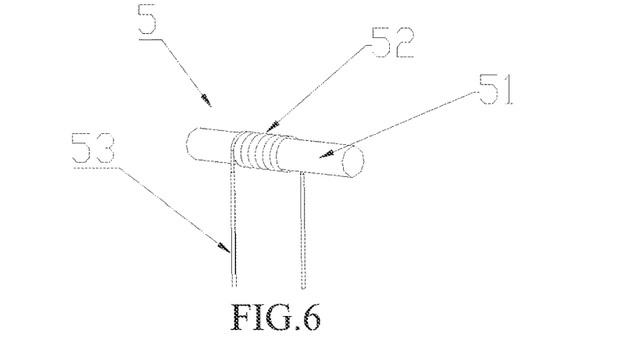
FIG. 6 is a structural view of a vaporizing unit according to the first and second embodiments of the present invention.
Figure 7:
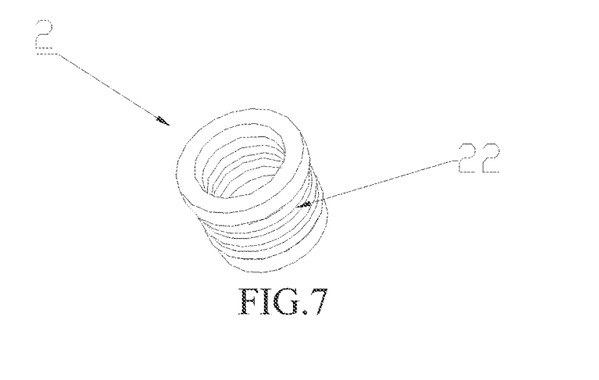
FIG. 7 is a perspective view of a vapor tube sleeve according to the first and second embodiments of the present invention.
Figure 8:
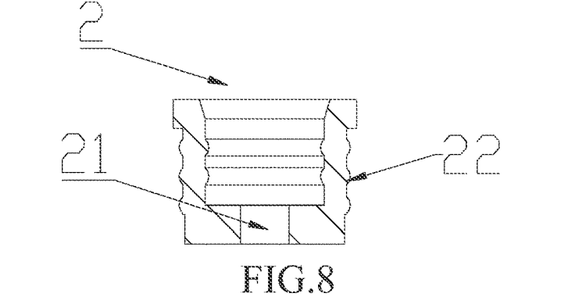
FIG. 8 is a sectional view of the vapor tube sleeve according to the first and second embodiments of the present invention.
Figure 9:
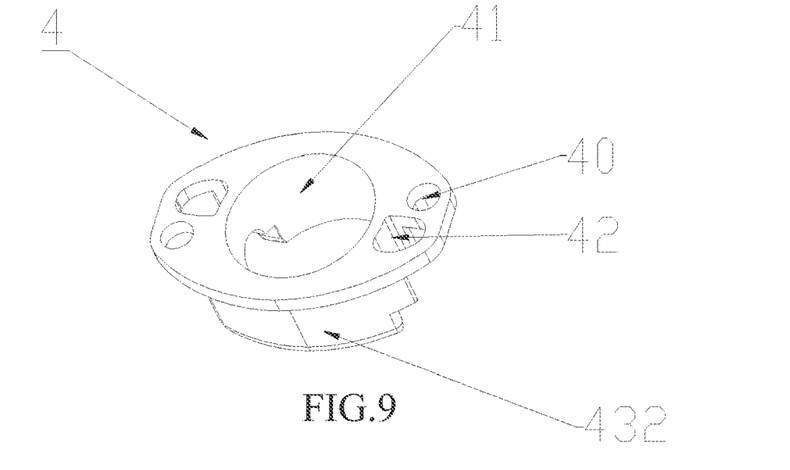
FIG. 9 is a first perspective view of a throttle lid according to the first embodiment of the present invention.
Figure 10:
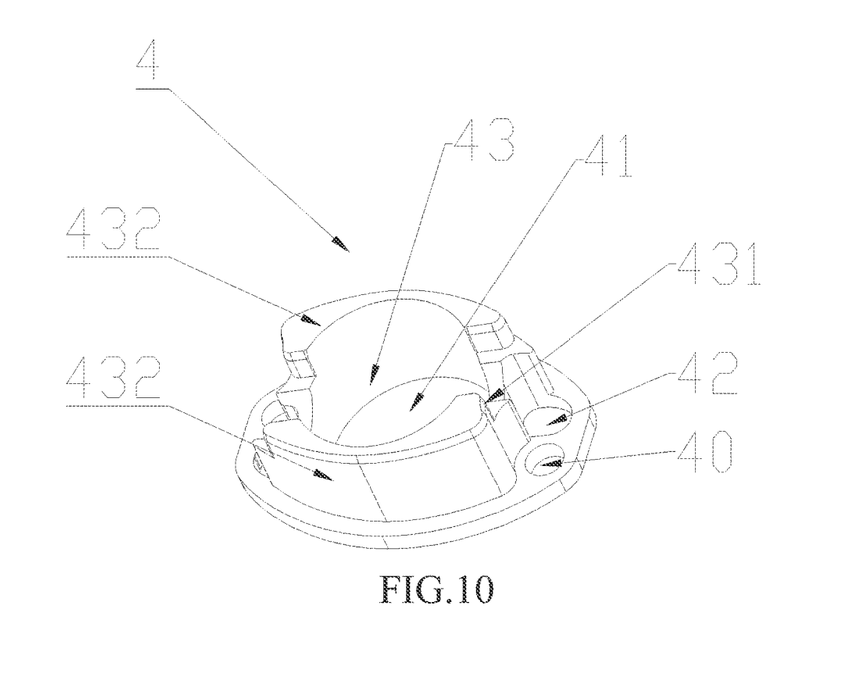
FIG. 10 is a second perspective view of the throttle lid according to the first embodiment of the present invention.
Figure 11:
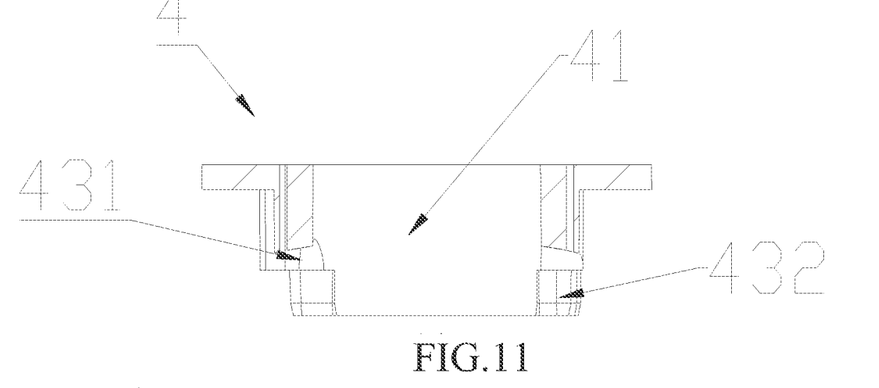
FIG. 11 is a front sectional view of the throttle lid according to the first embodiment of the present invention.
Figure 12:
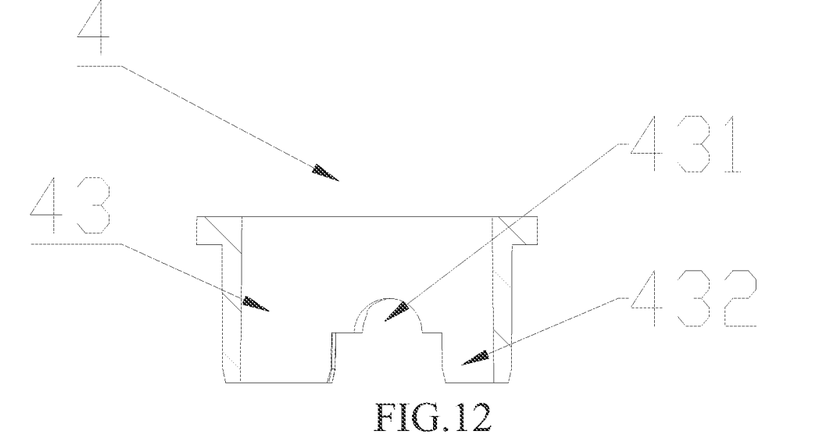
FIG. 12 is a sectional side view of the throttle lid according to the first embodiment of the present invention.
Figure 13:
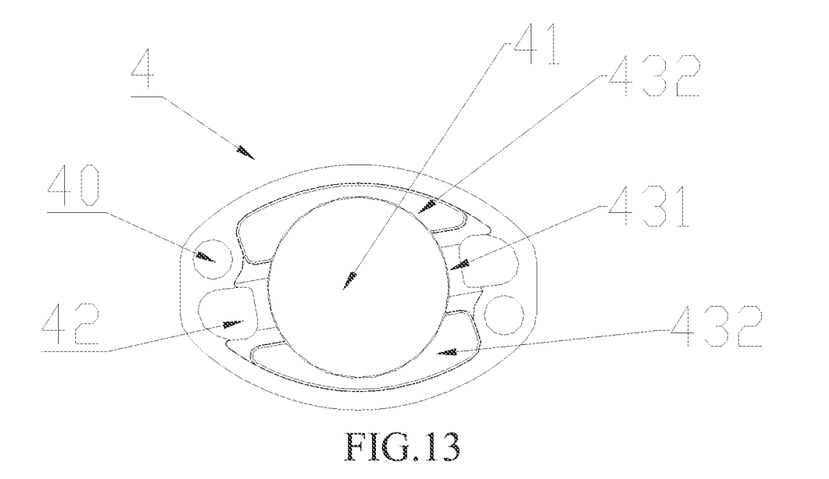
FIG. 13 is a bottom view of the throttle lid according to the first embodiment of the present invention.
Figure 14:
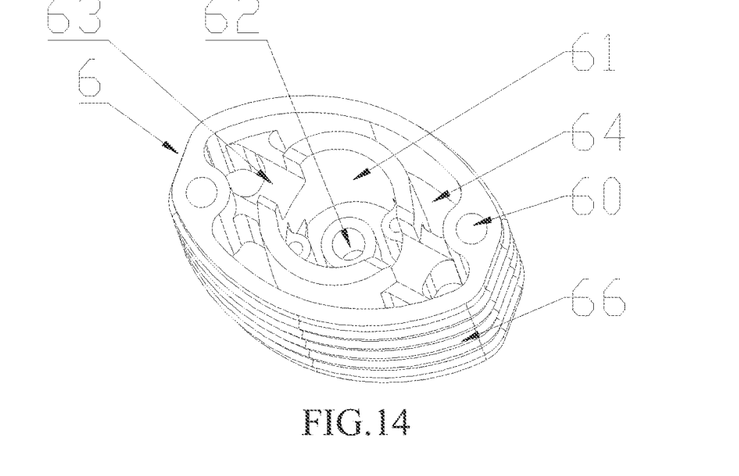
FIG. 14 is a perspective structural view of a vaporizing base according to the first embodiment of the present invention.
Figure 15:
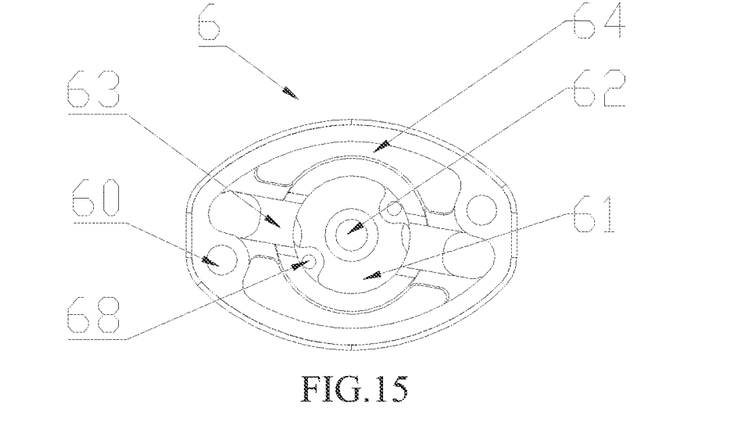
FIG. 15 is a top view of the vaporizing base according to the first embodiment of the present invention.
Figure 16:
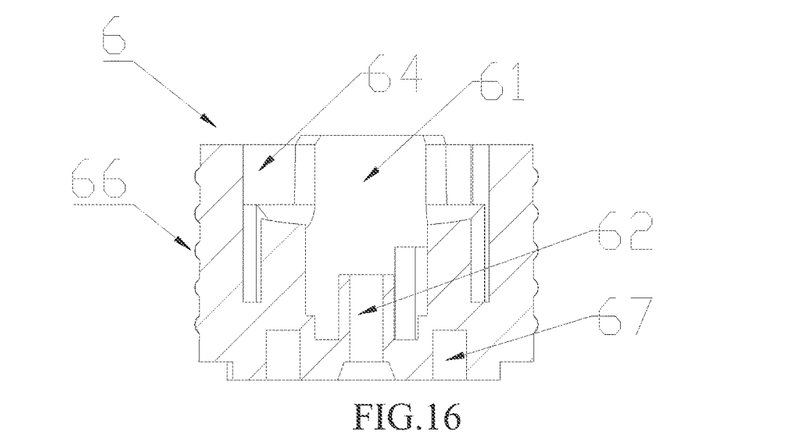
FIG. 16 is a front sectional view of the vaporizing base according to the first embodiment of the present invention.
Figure 17:
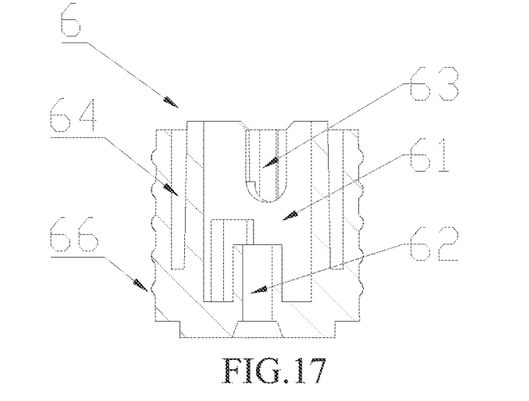
FIG. 17 is a sectional side view of the vaporizing base according to the first embodiment of the present invention.

Referring to FIGS. 3, 4, 18, and 19, the end portion of the opening end 12 of the vaporizer housing is provided with an intake air gap 121, the bottom of the electrode lid 7 is correspondingly provided with an intake air gap 74 of the electrode lid in communication with the intake air gap 121 of the vaporizer housing, and the side wall of the opening end 12 of the vaporizer housing is vertically provided with an air inlet groove 15 in communication with the intake air gap 121 of the vaporizer housing. In the case that the opening end 12 of the vaporizer housing of the vaporizer according to the present embodiment of the present invention is engaged in the connecting end (not shown) of the battery component, an air intake passage (not shown) can be defined between the air inlet groove 15 and the inner wall of the connecting end of the battery component. During using, outer air can enter in via the air intake passage, then flow through the intake air gap 121 of the vaporizer housing, the intake air gap 74 of electrode lid, the second air inlet 72 and the first air inlet 62 and flow into the vaporizing chamber 65. In such case, the e-cigarette liquid absorbed by the liquid guiding strip 51 can be heated and vaporized by means of the heating coil 52 in operation, to produce vapor of the e-cigarette. Then, the vapor of the e-cigarette in the vaporizing chamber 65 can flow out through the vapor outlet hole 21, the vapor outlet tube 112, and the mouthpiece 111, and be inhaled by the user. The above described flow directions of the air and the vapor are indicated by arrows as shown in FIG. 4.

Referring to FIGS. 1-5, the cross section of the vaporizer housing 1 is oval-shaped and gradually increases from top to bottom. Such structure with a smaller upper portion and a bigger lower portion facilitates the comfort of the mouthpiece end 11 for the user. Such oval-shaped structure not only is convenient to use and carry by the user, but also makes it possible to provide a bigger liquid storage chamber in the vaporizer housing 1.

Referring to FIGS. 1, 8, 14, and 16, the vapor tube sleeve 2 is made of soft materials such as silica gel, and it is provided on its inner wall and its outer wall with a plurality of protruding rings 22 to improve sealing performance. The vaporizing base 6 is made of soft materials and it is provided on its outer wall with a plurality of protruding rings 66 to improve sealing performance.

Embodiment 2

On the basis of the structure in the first embodiment, the present embodiment partly modifies the inner structure of the throttle lid and the vaporizing base, as shown in FIGS. 24-33.

Referring to FIGS. 4, 5, and 24-28, the throttle lid 4 is provided with a center hole 41 and throttle orifices 42, wherein the inner wall of the upper portion of the center hole 41 tightly abuts against the outer wall of the vapor tube sleeve 2, the outer circumferential wall of the throttle lid 4 abuts against the inner wall of the vaporizer housing 1, and a liquid storage chamber 13 for storing the e-cigarette liquid is formed between the upper side of the throttle lid 4, the outer wall of the vapor outlet tube 112, and the inner wall of the vaporizer housing 1. Herein, the throttle orifices 42 extend through the half annular rings 432, and the throttle orifices 42 are in communication with the liquid storage chamber 13. The lower side of the throttle lid 4 is provided with an annular ring 43 protruding downwards from the inner wall of the center hole 41, and the bottom of the annular ring 43 is formed in a radial direction with two symmetrical upper grooves 431 which accommodate the upper half of the liquid guiding strip 51 extending transversely. The lower portion of the annular ring is divided into two half annular rings 432 by the upper grooves 431.

Referring to FIGS. 4, 5, and 29-32, a concave cavity 61 extending downwards is formed at the center of the upper end of the vaporizing base 6, and a first air inlet 62 is provided at the bottom of the concave cavity 61. Herein, lead through-holes 68 through which the leads 53 of the heating coil 52 can pass are provided at two sides of the first air inlet 62. Lower grooves 63 which accommodate the lower half of the liquid guiding strip 51 extending transversely are formed in a radial direction at two sides of the concave cavity 61 on the upper end of the vaporizing base 6, and half annular grooves 64 for accommodating respective half annular rings 432 are provided at two sides of the lower grooves 63 and around the concave cavity 61.

Figure 33:
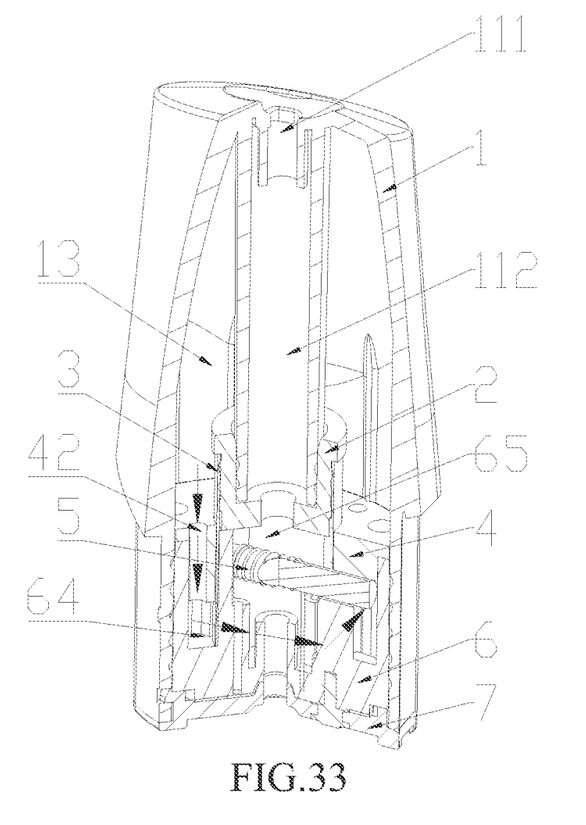
FIG. 33 is a partial perspective sectional view illustrating the second embodiment of the present invention.

Referring to FIGS. 1, 4, 5, and 33, the throttle lid 4 fits tightly over the vaporizing base 6, the upper grooves 431 and the lower grooves 63 are vertically aligned with each other and joined to seal the liquid guiding strip 51, such that the liquid guiding strip 51 extends between the upper grooves 431 and the lower grooves 63 with no gap. The half annular rings 432 are sealingly received in the half annular grooves 64, and a vaporizing chamber 65 is defined between the concave cavity 61 and the bottom of the vapor tube sleeve 2. The half annular rings 432 are received in the half annular grooves 64, cavities are formed at the bottoms of the half annular grooves 64, and the throttle orifices 42 extending through the half annular rings 432 can be in communication with the cavities formed at the bottoms of the half annular grooves 64. The two end portions of the liquid guiding strip 51 are in communication with the half annular grooves 64 in the case that the upper grooves 431 and the lower grooves 63 are joined, such that the e-cigarette liquid stored in the liquid storage chamber 13 can flow to the two end portions of the liquid guiding strip 51 through the throttle orifices 42 and the cavities formed at the bottoms of the half annular grooves 64. The liquid guiding strip 51 can absorb the e-cigarette liquid at the two end portions, and the e-cigarette liquid guided to the middle portion can be heated and vaporized by means of the heating coil 52. Such liquid supply method is an indirect liquid supply method in which the liquid can flow through the throttle orifices from the cavities formed at the bottoms of the half annular grooves to the end portions of the liquid guiding strip, and FIG. 33 shows the direction in which the e-cigarette liquid flows. Due to the structure in which the throttle lid 4 and the vaporizing base 6 are sealingly connected and the upper grooves 431 and the lower grooves 63 are vertically aligned with each other and joined to seal the liquid guiding strip 51, the e-cigarette liquid at the two ends of the liquid guiding strip 51 is prevented from directly leaking into the vaporizing chamber 65. Furthermore, due to the sealing structures between the vapor tube sleeve 2 and the outer wall of the vapor outlet tube 112, and the inner wall of the center hole 41 of the throttle lid 4, the e-cigarette liquid in the liquid storage chamber 13 is prevented from directly leaking into the vaporizing chamber 65, thereby ensuring normal operation of the vaporizer.

INDUSTRIAL APPLICABILITY

All the above are merely preferred embodiments of the present invention, which are not intended to limit the present invention in any form. The present invention is intended to cover all changes, various modifications and equivalent arrangements those skilled in the art can make according to the technical essence of the present invention.

The invention claimed is:

1. An electronic cigarette vaporizer, which can be connected with a battery component to constitute an electronic cigarette, comprising: a hollow vaporizer housing and a vaporizing device sleeved inside the vaporizer housing;
   wherein the vaporizer housing has a mouthpiece end and an opening end, a mouthpiece is arranged in a center of the mouthpiece end, a vapor outlet tube extending inside the vaporizer housing in an inward direction from the mouthpiece to a middle portion of the vaporizer housing is arranged, and the opening end is arranged with a connecting device for connection with the battery component;
   wherein the vaporizing device is disposed in the vaporizer housing at one side where the opening end is formed, and the vaporizing device comprises a vapor tube sleeve, a throttle lid, a heating unit, a vaporizing base and an electrode lid, which are arranged in turn towards an outer side from an inner side, and the heating unit comprises a liquid guiding strip and a heating coil wound around a middle portion of the liquid guiding strip;
   wherein the vapor tube sleeve is cup-shaped and sleeved onto an outer wall of an opening end of the vapor outlet tube, and a vapor outlet hole is formed at a bottom of the vapor tube sleeve;
   wherein the throttle lid is provided with a center hole and throttle orifices, an inner wall of an upper portion of the center hole abuts against an outer wall of the vapor tube sleeve, an outer circumferential wall of the throttle lid abuts against an inner wall of the vaporizer housing, and a liquid storage chamber is formed between an upper side of the throttle lid, the outer wall of the vapor outlet tube, and the inner wall of the vaporizer housing, wherein the throttle orifices are in communication with the liquid storage chamber, a lower side of the throttle lid is provided with an annular ring protruding downwards from the inner wall of the center hole, and a bottom of the annular ring is formed in a radial direction with upper grooves which accommodate an upper half of the liquid guiding strip extending transversely and divide a lower portion of the annular ring into two half annular rings;
   wherein a concave cavity extending downwards is formed at a center of an upper end of the vaporizing base, and a first air inlet is provided at a bottom of the concave cavity, lower grooves which accommodate a lower half of the liquid guiding strip extending transversely are formed in a radial direction at two sides of the concave cavity on the upper end of the vaporizing base, and half annular grooves for accommodating respective half annular rings are provided at two sides of the grooves and around the concave cavity;
   wherein the throttle lid fits tightly over the vaporizing base, the upper grooves and the lower grooves are vertically aligned with each other and joined to seal the liquid guiding strip, the liquid guiding strip extends between the upper grooves and the lower grooves, the half annular rings are sealingly received in the half annular grooves, a vaporizing chamber is defined between the concave cavity and the bottom of the vapor tube sleeve, and the throttle orifices are in communication with two end portions of the liquid guiding strip;

wherein the electrode lid is disposed at a bottom of the vaporizing base and is fixed to an inner wall of the opening end of the vaporizer housing, the electrode lid is arranged with positive and negative electrodes for electrically connecting with two ends of the heating coil, and a second air inlet is provided at a center of the electrode lid.

2. The electronic cigarette vaporizer according to claim 1, wherein a metal sleeve is sleeved at the outer wall of the vapor tube sleeve, a lower portion of the metal sleeve is sleeved in the center hole of the throttle lid and abuts against inner walls of the half annular rings, and the lower portion of the metal sleeve is provided, at a position corresponding to the upper grooves of the throttle lid, with U-shaped notches through which the liquid guiding strip can extend.

3. The electronic cigarette vaporizer according to claim 1, wherein the throttle orifices are arranged above the two end portions of the liquid guiding strip, and the two end portions of the liquid guiding strip are not in communication with the half annular grooves when the lower grooves and the upper grooves are joined.

4. The electronic cigarette vaporizer according to claim 1, wherein cavities are formed at bottoms of the half annular grooves, the throttle orifices extending through the half annular rings are in communication with the cavities formed at the bottoms of the half annular grooves, and the two end portions of the liquid guiding strip are respectively in communication with the half annular grooves when the lower grooves and the upper grooves are joined.

5. The electronic cigarette vaporizer according to claim 1, wherein the connecting device comprises a male snap formed on an outer wall of the opening end of the vaporizer housing, and the male snap can be correspondingly snap-fitted to a snap-in groove provided on an inner wall of a connecting end of the battery component.

6. The electronic cigarette vaporizer according to claim 1, wherein the vaporizing base and the throttle lid are respectively formed with liquid refilling holes communicating with each other, the liquid refilling holes are in communication with the liquid storage chamber, and the electrode lid is further arranged with a plunger for correspondingly blocking the liquid refilling hole of the vaporizing base.

7. The electronic cigarette vaporizer according to claim 1, wherein an end portion of the opening end of the vaporizer housing is provided with an intake air gap of the vaporizer housing.

8. The electronic cigarette vaporizer according to claim 1, wherein the vapor tube sleeve is made of soft materials, and the vapor tube sleeve is provided on its inner wall and its outer wall with a plurality of protruding rings to improve sealing performance.

9. The electronic cigarette vaporizer according to claim 1, wherein the vaporizing base is made of soft materials and the vaporizing base is provided on its outer wall with a plurality of protruding rings to improve sealing performance.

10. The electronic cigarette vaporizer according to claim 1, wherein cross section of the vaporizer housing is oval-shaped and gradually increases from top to bottom.

\* \* \* \* \*